United States Patent [19]
Asada et al.

[11] Patent Number: 5,979,629
[45] Date of Patent: Nov. 9, 1999

[54] CLUTCH PRESSING ASSEMBLY

[75] Inventors: Masaaki Asada, Ibaraki; Kozo Uno, Shijyonawate; Toshiya Kosumi, Kadoma, all of Japan

[73] Assignee: Exedy Corporation, Osaka, Japan

[21] Appl. No.: 09/145,835

[22] Filed: Sep. 2, 1998

[30] Foreign Application Priority Data

Sep. 8, 1997 [JP] Japan ................................ 9-243082

[51] Int. Cl.$^6$ ................................................ F16D 13/54
[52] U.S. Cl. ................. 192/70.25; 192/70.3; 192/89.24; 192/99 A; 192/111 B; 192/113.5
[58] Field of Search ............................ 192/70.25, 70.27, 192/70.29, 70.3, 89.24, 98, 99 A, 111 B, 113.5

[56] References Cited

U.S. PATENT DOCUMENTS

| | | | |
|---|---|---|---|
| 4,036,338 | 7/1977 | Linn et al. .................... | 192/70.29 X |
| 4,848,550 | 7/1989 | Kitano et al. .................. | 192/99 A |
| 4,895,235 | 1/1990 | Nishimura et al. ............. | 192/70.3 |
| 5,373,927 | 12/1994 | Gochenour et al. ........... | 192/70.3 |
| 5,593,015 | 1/1997 | Kosumi et al. ................ | 192/70.27 |

*Primary Examiner*—Richard M. Lorence
*Attorney, Agent, or Firm*—Shinjyu Global IP Counselors, LLP

[57] ABSTRACT

The pull-type clutch 1 basically includes a clutch disc assembly 4, a clutch cover assembly 5, a cylindrical or tubular member 21 and a release mechanism 6. The pull-type clutch 1 is designed to restrain the rotational engagement between the release mechanism 6 and the input shaft 3 of the transmission. The cylindrical member 21 is fixedly coupled to the front cover 7 of the transmission and extends around the input shaft 3 in the radial direction spaced apart. The release mechanism 6 is a mechanism for releasing the biasing force by the diaphragm spring 14 of the clutch cover assembly 5. The release mechanism 6 has a sleeve 23 and a bearing 24. The sleeve 23 is supported on an outer surface of the cylindrical member 21 for axial movement. The bearing 24 is disposed within the clutch cover 11 and is located between the sleeve 23 and the retainer 13.

29 Claims, 3 Drawing Sheets

CLUTCH PRESSING ASSEMBLY

BACKGROUND OF THE INVENTION

1. Field of the Invention

This invention generally relates to a releasing operation for a clutch. More specifically, the present invention relates to a release mechanism for a pull-type clutch used in automobiles.

2. Background Information

A clutch assembly is disposed between a flywheel of an engine and a transmission of an automotive vehicle. Such a clutch assembly typically includes a clutch disc assembly, a clutch cover assembly and a release mechanism. The clutch disk assembly has a hub non-rotatably coupled with the input shaft of the transmission and a friction coupling member extending from the hub to a location adjacent to the flywheel. The clutch cover assembly used for in an automobile clutch generally includes a bowl-shaped clutch cover fixedly coupled to the flywheel, a pressure plate provided inside the clutch cover and a diaphragm spring or elastic member for pressing the pressure plate toward the flywheel. The pressure plate is disposed adjacent to the friction coupling member, and is axially movable. In particular, the friction coupling member is axially movably by the pressure plate against the flywheel. The release mechanism is axially moveable for releasing the biasing force of the diaphragm spring toward the pressure plate.

The clutch cover assembly can further include a retainer coupled to the release mechanism and one or more lever members disposed between the retainer and the pressure plate. In this type of clutch cover assembly, the retainer is pressed by the diaphragm spring toward the flywheel. The biasing force of the diaphragm spring is transmitted via the lever members to the pressure plate. In this type of clutch cover assembly, the biasing force of the diaphragm spring is magnified in accordance with a lever ratio of the lever members, and thus, a force greater than the biasing force of the diaphragm spring is applied to the pressure plate. Consequently, even if the biasing force or spring rate of the diaphragm spring is set at a low level, a sufficient pressing force can still be applied to the pressure plate. By setting the biasing force or the spring rate of the diaphragm spring at a low level, resistance force by the diaphragm spring during the release operation is reduced. Therefore, the release load is diminished, and the amount of force or required leg-power to depress the clutch pedal is reduced.

A release mechanism utilized with the conventional clutch cover mainly consists of a sleeve, a bearing and an outer housing or collar. The sleeve is disposed around the outer circumference of the input shaft of the transmission with one of the axial ends of the sleeve contacting a flywheel-side surface of the retainer. An inner race of the bearing is fixedly coupled on the end of the outer circumferential surface of the sleeve, which is adjacent to the transmission. An annular housing or quill is fixedly coupled on an outer race of the bearing. A cylindrical bushing is forced into the sleeve to engage the inner circumferential surface of the sleeve. The bushing contacts an outer circumferential surface of the input shaft of transmission such that the bushing and the input shaft can slide relative to each other in the axial direction and rotate relative to each other in the circumferential direction. The bushing is composed of a wear resistant material. An annular recess can be formed on the inner circumferential surface of the sleeve in order to maintain grease therebetween.

When the clutch is engaged with the flywheel, this clutch cover assembly rotates synchronously with the input shaft, such that no relative rotation occurs between the sleeve and the input shaft. However, when the clutch is disengaged from the flywheel, the input shaft of the transmission stops rotating, such that the relative rotation occurs between the sleeve and the input shaft. As a result, the bushing is abraded by the relative rotating movement therebetween.

In view of the above, there exists a need for a clutch which overcomes the above mentioned problems in the prior art. This invention addresses this need in the prior art as well as other needs, which will become apparent to those skilled in the art from this disclosure.

SUMMARY OF THE INVENTION

One purpose of the present invention is to provide a clutch that reduces wear by restraining movement between the release mechanism and other members of the automobile clutch.

In accordance with one aspect of the present invention, a clutch is provided for transmitting torque between the flywheel of the engine and the input shaft extending from the transmission. The clutch in accordance with this aspect of the present invention basically includes a clutch disk assembly, a clutch cover assembly, a tubular member and a release mechanism. The clutch disk assembly has the friction coupling member positioned adjacent to the flywheel. The friction coupling member is nonrotatably engaged with the input shaft. The clutch cover assembly has a clutch cover, a pressure plate, an annular retainer, an elastic member and a lever member. The clutch cover is fixedly coupled to the flywheel. The pressure plate is disposed adjacent to the friction coupling member. The annular retainer is disposed within the clutch cover. The elastic member is supported by the clutch cover, and biases the retainer toward the flywheel. The lever member magnifies the biasing force of the elastic member against the retainer by predetermined lever ratio, and transmits the magnified force to the pressure plate. The tubular member is fixedly coupled to the surface of the transmission and extends around the input shaft such that the inner surface of the tubular member is radially spaced from the outer surface of the input shaft. The release mechanism is arranged to axially move the retainer for releasing biasing force of the elastic member toward the pressure plate by the clutch cover assembly. The release mechanism has a sleeve supported on outer circumference of the tubular member for axial movement. The release mechanism also has a bearing disposed between a flywheel-side end of the sleeve and the retainer.

In accordance with one aspect of the present invention, a clutch is provided with a sleeve to which torque is not transmitted from the clutch cover assembly by the bearing. The sleeve is supported on the outer circumferential surface of the tubular member for axial movement. The sleeve is fixedly coupled on the side of the transmission. The sleeve is relatively non-rotatable coupled to the cylindrical member and axially slidable relative to the cylindrical member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
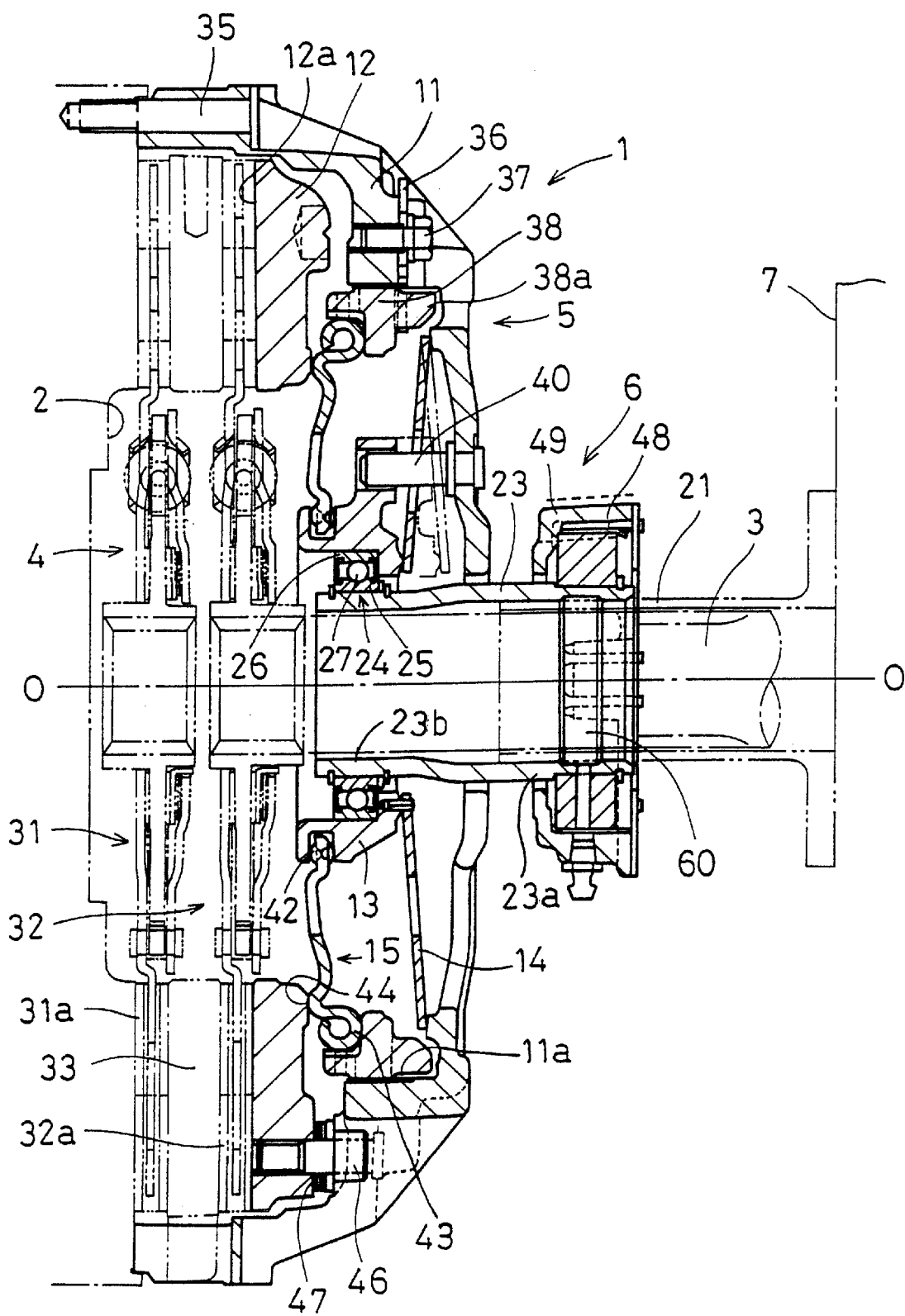
FIG. 1 is a schematic cross-sectional view of a pull-type clutch in accordance with a preferred embodiment of the present invention.

Referring initially to FIG. 1, a pull-type clutch 1 is illustrated which employs a preferred embodiment of the present invention. The pull-type clutch 1 is designed to be used in automobiles, especially in large size trucks. The pull-type clutch 1 is a device for selectively providing torque from an engine flywheel 2 to a transmission input shaft 3. Still referring to FIG. 1, the center line O—O denotes the axis of rotation for the pull-type clutch 1.

Figure 2:
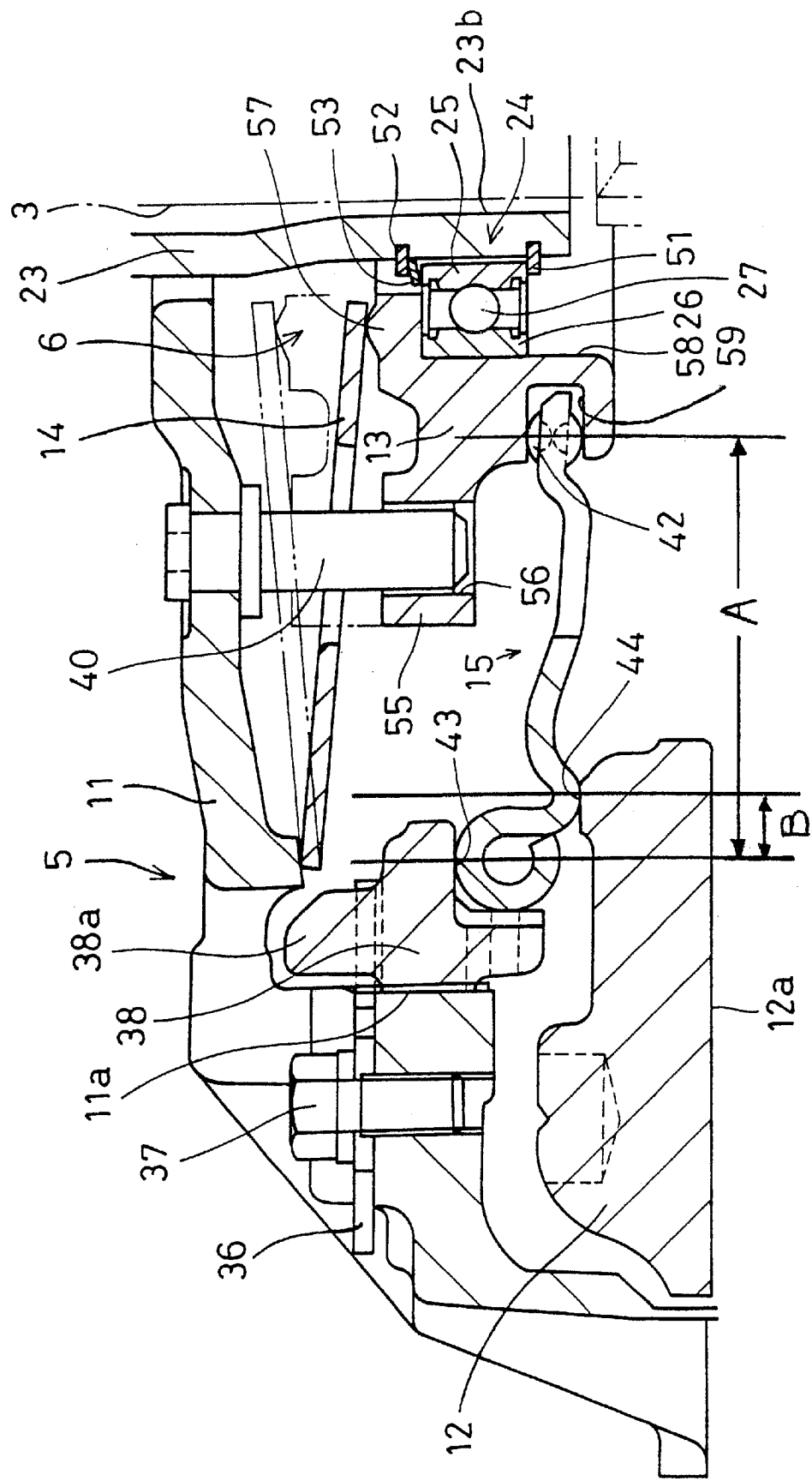
FIG. 2 is an enlarged, partial cross-sectional view of a portion of the pulltype clutch illustrated in FIG. 1.

In the illustrated embodiment, the pull-type clutch 1 is a multi-clutch, which basically includes a dual-clutch disc assembly 4, a clutch cover assembly 5, and a release device or mechanism 6. Of course, it will be apparent to those skilled in the art that the structure of the present invention can also be applied to a clutch utilizing a single clutch disc assembly or other arrangements of components. As shown in FIGS. 1 and 2, the pull-type clutch 1 is illustrated in an engaged state for transmitting torque from the engine (not shown) to the transmission (not shown). In particular, the clutch cover assembly 5 is fixedly coupled to the flywheel 2 of the engine and rotatably coupled to the input shaft of the transmission. The clutch disc assembly 4 is fixedly coupled to the input shaft of the transmission for rotating therewith. The release mechanism 6 is disposed adjacent to a front cover 7 (the exterior surface) of the transmission and surrounds the input shaft 3.

A cylindrical or tubular member 21 is fixedly coupled to the front cover 7. The cylindrical member 21 extends from the front cover 7 of the transmission toward the clutch cover assembly 5 and has the release mechanism 6 coupled thereto. The input shaft 3 of the transmission extends through the center bore of the cylindrical member 21 from the front cover 7. A space is maintained in the radial direction between the inner surface of the cylindrical member 21 and the outer surface of the input shaft 3. The input shaft 3 preferably has a length such that it extends axially through the cylindrical member 21 and the clutch disc assembly 4 with the tip of the input shaft 3 being located adjacent to the flywheel 2.

As seen in FIG. 1, the clutch disc assembly 4 is primarily composed of a first clutch disc 31 and a second first clutch disc 32. The first clutch disc 31 and the second clutch disc 32 have dampers for dampening torsional vibrations. The first clutch disc 31 and the second clutch disc 32 have friction facings 31 a and 32a coupled to their respective outer peripheral portions. The friction facing 31 a of the clutch disc 31 is located adjacent to the friction surface of the flywheel 2. An annular intermediate plate 33 is located between one of the friction facings 31 a of the first clutch disc 31 and one of the friction facings 32a of the second clutch disc 32. The annular intermediate plate 33 is provided with a plurality of projections on its outer circumference. These projections are designed to engage part of the clutch cover 11. In the illustrated embodiment, the friction facings 31 a and 32a are attached to opposite surfaces of a planar plate instead being coupled to a conventional cushioning plate. The input shaft 3 of the transmission engages in spline with center portions of the first and second clutch discs 31 and 32. Thus, the input shaft 3 of the transmission rotates with the first and second clutch discs 31 and 32.

The clutch cover assembly 5 primarily includes a clutch cover 11, a pressure plate 12, a retainer 13, and a conical diaphragm spring 14. The clutch cover 11 is formed generally a bowl-shaped member, which is configured to be fixedly coupled to the flywheel 2. The clutch cover 11 encloses the clutch disc assembly 4 between it and flywheel 2. Preferably, the clutch cover 11 is fixedly coupled to the flywheel 2 at its outer circumferential portion by bolts 35. A center hole is formed at a center portion of the clutch cover 11 for allowing the input shaft 3 to extend into the clutch cover 11.

The pressure plate 12 is an annular member, which is disposed within the clutch cover 11. The pressure plate 12 has a pressing surface 12a opposing the friction facing 32a of the second clutch disc 32. An outer circumferential portion of the pressure plate 12 is coupled to the clutch cover 11 via a plurality of strap plates 47. One end of each of the strap plates 47 is fixedly coupled to the outer circumferential portion of the pressure plate 12 by a bolt 46. The other ends of the strap plates 47 are fixedly coupled to the clutch cover 11 in a conventional manner. The strap plates 47 extend tangentially between the pressure plate 12 and the clutch cover 11. These strap plates 47 allow the pressure plate 12 to move in an axial direction relative to the clutch cover 11, but do not allow for relative rotation between the pressure plate 12 and the clutch cover 11.

As best shown in FIG. 2, the clutch cover 11 has a screw portion 11 a with threads formed on the inner circumferential wall of the clutch cover 11. The screw portion 11a is threadedly coupled to an annular adjuster ring 38, which has external threads that engage the internal threads of the screw portion 11a. The adjuster ring 38 has a plurality of projections 38a, which are formed on the transmission side of the adjuster ring 38. The projections 38a are circumferentially spaced apart along the transmission side of the adjuster ring 38.

A lock plate 36 is provided between the adjuster ring 38 and to the clutch cover 11 to prevent relative rotation from occurring between the adjuster ring 38 and to the clutch cover 11. The lock plate 36 is fixedly coupled to the clutch cover 11 by bolts 37. The lock plate 36 has its inner circumferential portion engaged with the projections 38a to restrain the adjuster ring 38 from rotating relative to the clutch cover 11. The axial position of the adjuster ring 38 can change by removing the lock plate 36 and then rotating the adjuster ring 38 relative to the clutch cover 11. The adjuster ring 38 can then be fixedly coupled at its new location relative to the clutch cover 11 by attaching the lock plate 36.

The retainer 13 is an annular member, which is disposed around the outer circumference of the input shaft 3 of the transmission. The retainer 13 is positioned within the clutch cover 11 on the end of the release mechanism 6. As best shown in FIG. 2, the retainer 13 has a plurality of axial holes 56, which are circumferentially space apart on the outer peripheral portion 55 of the retainer 13. The retainer 13 is fixedly coupled for rotation with the clutch cover 11 by a plurality of pins 40. One end of each of the pins 40 is fixedly coupled to the clutch cover 11, while the other ends of the pins 40 are located within the holes 56. The pins 40 also extend through holes formed on the diaphragm spring 14 (described later). As a result, the retainer 13 and the diaphragm spring 14 rotate with the clutch cover 11 as a single unit, but allows for axial movement of the retainer 13 relative to the clutch cover 11.

As also seen in FIG. 2, the retainer 13 has an engagement portion 57 and an annular groove 59. The engagement portion 57 is formed at the inner circumference of the transmission-side portion of the retainer 13 and extends radially inwardly from the retainer 13. The annular groove 59 is formed in the outer circumferential surface of the retainer 13. The annular groove 59 is located on the flywheel-side portion of the retainer 13 and opens outwardly in the radial direction.

The diaphragm spring 14 is an elastic member, which has a generally disc-shaped configuration. Of course, other types of elastic members can be used. For example, a plurality of compression springs can be positioned between the clutch cover 11 and the retainer 13. The diaphragm spring 14 is located within the clutch cover 11, and is disposed axially between the retainer 13 and the clutch cover 11. The outer peripheral end of the diaphragm spring 14 is supported against the clutch cover 11. The inner circumferential end of the diaphragm spring 14 is supported against the engagement portion 57 of the retainer 13. The diaphragm spring 14 provides a predetermined pressing force toward the retainer 13.

Six lever members 15 are provided between the pressure plate 12 and the retainer 13. The lever members 15 are spaced apart from each other in the circumferential direction. The lever members 15 are preferably formed, for example, by bending rectangular plates. The lever members 15 form a lever mechanism. Each of the lever member 15 has a first engagement portion 42 at an inner circumferential end, a second engagement portion 43 at an outer circumferential end and a third engagement portion 44 at an intermediate portion between the first and second engagement portions 42 and 43. The first engagement portion 42 has a pair of oppositely facing engagement surfaces. These engagement surfaces are axial facing surfaces that are curved. These engagement surfaces of the first engagement portion 42 are engaged with the both axial surfaces of the annular groove 59. Thus, the lever members 15 are axially swingable within the annular groove 59 of the retainer 13 by the first engagement portions 42. In other words, the first engagement portions 42 of the lever members 15 pivotally couple the lever members 15 to the retainer 13 for movement in the axial direction. The outer circumferential ends of the lever members 15 are each bent in circular shape. The second engagement portions 43 are formed on the transmission-side of the curved outer circumferential ends of the lever members 15. The second engagement portions 43 contact the flywheel-side surface of the adjuster ring 38. The third engagement portions 44 are also formed on the outer circumferential ends of the lever members 15. In particular, the third engagement portions 44 are located on the opposite sides of the lever members 15 from the second engagement portions 43. In other words, the third engagement portions 44 project towards the flywheel to contact the inner circumferential portion of the pressure plate 12.

The force of the diaphragm spring 14 can be magnified by the previously described lever members 15 so that the outer diameter third engagement portions 44 are can be smaller. Therefore, the clutch cover assembly 5 is miniaturized in radial direction.

The release mechanism 6 is primarily composed of a sleeve 23 and a bearing 24. The sleeve 23 is a cylindrical or tubular member, which is disposed around outer circumference of the input shaft 3. The sleeve 23 has a first end or transmission side portion 23a and a second end or flywheel side portion 23b. The flywheel side portion 23b of sleeve 23 extends into a center opening in the clutch cover 11. The sleeve 23 is arranged to move axially within the center opening of the clutch cover 11. In 20 particular, the flywheel side portion 23b of the sleeve 23 extends into the clutch cover 11 so as to be located adjacent to the clutch disc assembly 4. The flywheel side portion 23b of the sleeve 23 is coupled to the inner circumference of the retainer 13. The transmission side portion 23a of the sleeve 23 extends towards the transmission and overlies the cylindrical or tubular member 21, which extends from the front cover 7 of the transmission.

The bearing 24 is a coupling member, which is designed not to transmit torque between the retainer 13 and the sleeve 23, but to transmit a force in the axial direction between the retainer 13 and the sleeve 23. The bearing 24 is disposed between the inner circumference of the retainer 13 and the flywheel side portion 23b of the outer circumference of the sleeve 23. More specifically, the bearing 24 is basically composed of an inner race 25, an outer race 26 and a plurality of balls 27, which are disposed between the inner race 25 and the outer race 26. The axial end surfaces of the inner race 25 are placed between two snap rings 51 and 52, which fixedly couple the bearing 24 to the sleeve 23. The outer race 26 is fixedly coupled to the inner circumferential surface 58 of the retainer 13 by a press fit. The transmission side surface of the outer race 26 contacts the side surface of the engagement portion 57 that faces the flywheel.

A cone-shaped spring 53 is disposed between the transmission side of the snap ring 52 and the axial end surface of the inner race 25. The cone-shaped spring 53 biases the inner race 25 of the bearing 24 against the snap ring 51, i.e., the bearing 24 is biased towards the flywheel.

As shown in FIG. 2, a small space is maintained (in the radial direction) between the inner circumferential surface of the inner race 25 and the outer circumferential surface of the sleeve 23. This radial space ensures that no larger force will be transmitted to the bearing 24, even if the release mechanism 6 is slightly off center relative to the center of the clutch cover assembly 5.

The inside diameter of the transmission side portion 23a of the sleeve 23 is larger than that of the flywheel side portion 23b. The inner circumferential surface of the transmission side portion 23a of the sleeve 23 contacts the outer circumferential surface of the cylindrical member 21. The sleeve 23 is movably supported on the cylindrical member 21 for movement in both the radial direction and the axial direction.

In this embodiment, an annular groove 60 is formed on the inner circumferential surface of the transmission side portion 23a of the sleeve 23 for receiving grease therein. The grease is retained in the grease receiving groove 60 for lubricating the sliding surfaces between the sleeve 23 and the cylindrical member 21 to avoid seizure of the sliding surfaces. The member 48 and the housing or quill 49 are fixedly coupled together and located on the outer circumferential surface of the transmission side portion 23a of the sleeve 23. When the clutch pedal is stepped on, a biasing force is applied to the surfaces of the housing 49 to move the housing 49 toward the transmission.

In the release mechanism 6 previously mentioned, since the bearing 24 is disposed within the clutch cover 11, the axial dimension of the release mechanism 6 is axially reduced compared with release mechanisms that have the bearing located outside of the clutch cover. Thus, the total size of the pull-type clutch 1 is drastically reduced by the radial reduction of the clutch cover assembly 5 and the axial reduction of the release mechanism 6 as previously mentioned.

The explanation for operating the clutch 1 will now be discussed in more detail. During engagement of the clutch, the pressing force of the diaphragm spring 14 causes the retainer 13 to be pressed towards the flywheel 2, which in turn transmits the pressing force to the pressure plate 12 via the lever members 15. The pressure plate 12 presses the clutch disc assembly 4 against the flywheel 2. The retainer 13 is normally biased toward the flywheel 2 by the biasing force of the diaphragm spring 14. Thus, the clutch 1 is normally held in the engaged position by the diaphragm spring 14. As shown in FIG. 2, the first engagement portions 42 of the lever members 15 and the second engagement portions 43 of the lever members 15 are radially spaced apart from each other by a circumferential distance A. The second engagement portions 43 and the third engagement portions 44 are radially spaced apart from each other by a circumferential distance B. The lever ratio of the lever members 15 is expressed as A/B. The pressing force of the diaphragm spring 14 is multiplied by A/B as the force is applied to the pressure plate 12. By magnifying the pressing force applied to the pressure plate 12, the biasing force or spring rate of the diaphragm spring 14 can be set lower lever.

When the driver steps on the clutch pedal, the housing or collar 49 of the release mechanism 6 will be moved toward the transmission. As a result of this movement, the retainer 13 also simultaneously moves towards the transmission. In particular, since the retainer 13 is fixedly coupled to the housing or collar 49 by the sleeve 23 and the bearing 24, the axial movement of the housing or collar 49 cause the retainer 13 to move axially therewith. At this time, the diaphragm spring 14 provides a load in a direction opposite to the movement of the retainer 13 (i.e., a direction opposite of the release direction). Thus, the diaphragm spring 14 moves to a clutch releasing position illustrated in phantom lines in FIG. 1.

The relationship between the release mechanism 6 and the input shaft 3 will now be described. During the operation of the release mechanism 6, the sleeve 23 is moved axially about the tubular or cylindrical member 21. When the sleeve 23 moves axially, the inner circumferential surface of the sleeve 23 slides against the outer circumferential surface of the cylindrical member 21. Both the sleeve 23 and the cylindrical member 21 are tubular members, which do not rotate anytime. Moreover, no relative rotation occurs between the sleeve 23 and the cylindrical member 21. Therefore, abrasion due a sliding movement between the sleeve 23 and the cylindrical member 21 can at the least be prevented. Also, in this arrangement, a conventional bushing is not needed between the sleeve 23 and the cylindrical member 21.

The sleeve 23 is constructed such that torque is not transmitted from the retainer 13 by the bearing 24 when the clutch 1 is in the state of clutch disengagement. Also, no relative rotation occurs between the sleeve 23 and the input shaft 3 when the clutch 1 is in the state of clutch disengagement.

In the clutch engaged state, the sleeve 23 is supported around the input shaft 3 by the cylindrical member 21 such that the sleeve 23 is radially spaced around the input shaft 3. The cylindrical member 21 is also radially spaced apart from the input shaft 3. Therefore, practically no sliding movement occurs due to the relative rotation between the input shaft 3 and the two tubular members (the sleeve 23 and the cylindrical member 21).

OTHER EMBODIMENTS

Figure 3:
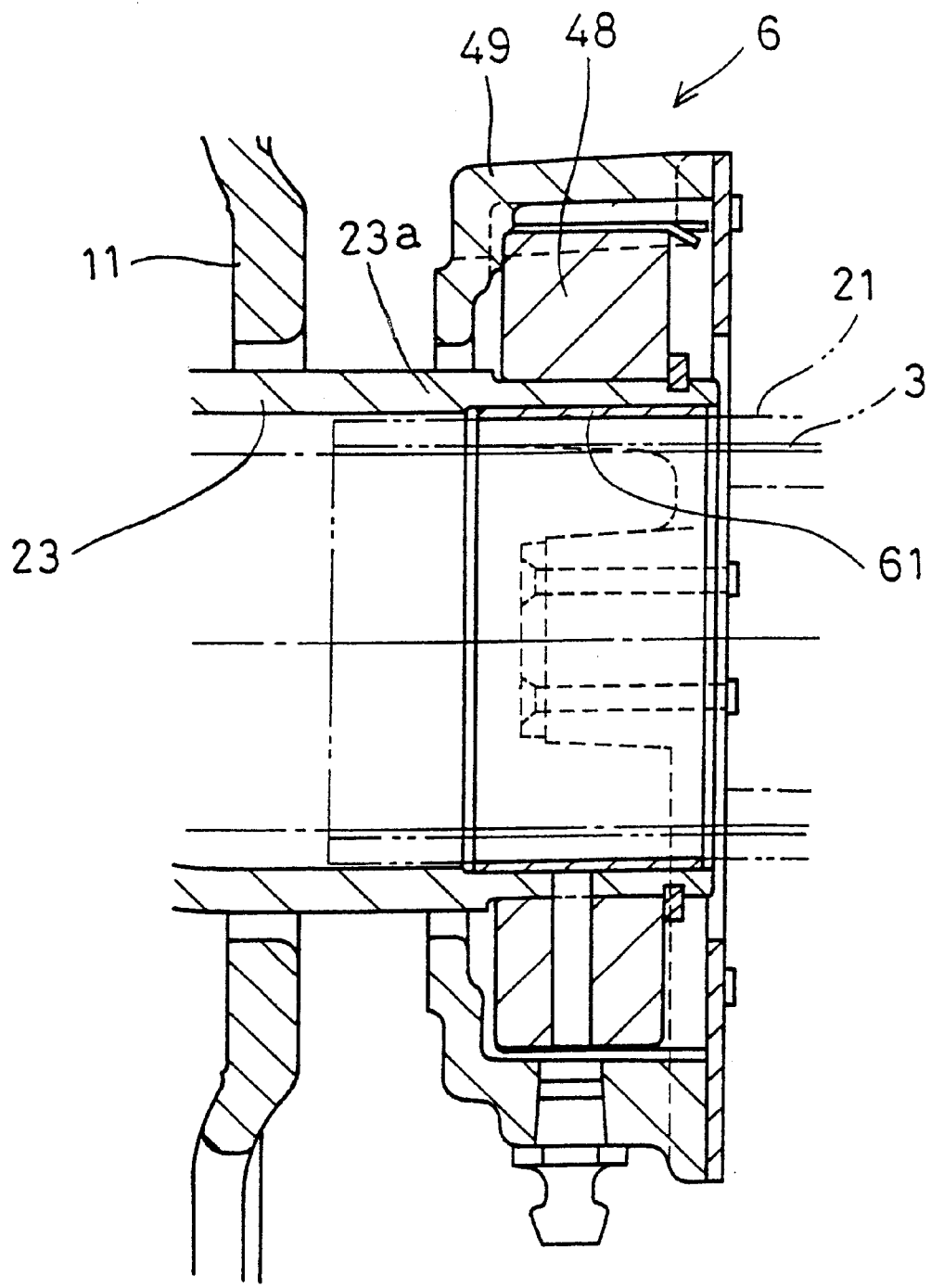
FIG. 3 is an enlarged, partial cross-sectional view of a portion of a modified release mechanism in accordance with another embodiment of the present invention.

As shown in FIG. 3, a bushing 61 can be disposed on the inner circumferential surface of the sleeve 23 for slidably engaging the cylindrical member 21. More specifically, the bushing 61 is a cylindrical member, which is made of an abrasion-resistant material. The bushing 61 is forced into the inner circumferential surface of the transmission side portion 23a of the sleeve 23. The sleeve 23 is supported on the cylindrical member 21 for axially movement via the bushing 63. Thus, the sleeve 23 does not directly contact with the cylindrical member 21. The bushing 61 is design to prevent seizure from occurring between the sleeve 23 and the cylindrical member 21.

EFFECTS OF THE INVENTION

In the clutch 1 of the present invention clutch, the sleeve 23 is supported for axially movement on the outer circumferential surface of the cylindrical member 21, which is fixedly coupled to the transmission. Since torque is not transmitted from the clutch cover assembly to the sleeve 23 by the bearing. The sleeve 23 only slides in axial direction and does not rotate relative to the cylindrical member 21. As a result, the sliding movement between the release mechanism and other members in the clutch of automobiles is restrained.

While only two embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch for transmitting torque between a flywheel of an engine and an input shaft extending from a transmission, said clutch comprising:

a clutch disk assembly having a friction coupling member adjacent to the flywheel, said friction coupling member being configured to be non-rotatably coupled with the input shaft of the transmission;

a clutch cover assembly having a clutch cover configured to be fixedly coupled to the flywheel, a pressure plate disposed adjacent to said friction coupling member, a retainer disposed within said clutch cover, an elastic member positioned between said clutch cover and said retainer to apply a biasing force on said retainer to bias said retainer toward the flywheel, a lever mechanism coupled between said retainer and said pressure plate to magnify said biasing force of said elastic member against said retainer by a predetermined lever ratio, which is transmitted to said pressure plate;

a tubular member having an inner end and an outer end, said outer end having mounting structure configured to be fixedly coupled to the transmission, said tubular member being adapted to extend around the input shaft, said tubular member having a bore that is sized to be radially spaced from the input shaft; and a release mechanism operatively coupled to said retainer, said release mechanism having a sleeve coaxially supported on said inner end of said tubular member for axial movement and a bearing disposed between said sleeve and said retainer, said outer end of said tubular member projecting out of said sleeve to be fixedly coupled to the transmission.

2. A clutch as set forth in claim 1, wherein said bearing is disposed within said clutch cover.

3. A clutch as set forth in claim 2, wherein
said sleeve has a flywheel side portion located within said clutch cover and a transmission side portion located outside of said clutch cover.

4. A clutch as set forth in claim 3, wherein
said transmission side portion of said sleeve has a housing coupled thereto.

5. A clutch as set forth in claim 1, wherein
said sleeve has an inner surface with an annular groove which is adapted to receive a lubricant material.

6. A clutch as set forth in claim 1, wherein
said lever mechanism has a first end in contact with a radial end surface of said retainer, a second end supported by said clutch cover and an intermediate portion extending towards said pressure plate to transmit said biasing force from said elastic member to said pressure plate.

7. A clutch as set forth in claim 6, wherein
said second end of said lever mechanism contacts adjuster ring which is adjustably coupled to said clutch cover for axial adjustment.

8. A clutch as set forth in claim 1, wherein
said elastic member is a conical spring with an outer circumferential end engaging said clutch cover and an inner circumferential end engaging said retainer.

9. A clutch as set forth in claim 1, wherein
said lever mechanism includes a plurality of circumferentially spaced lever members.

10. A clutch for transmitting torque between a flywheel of an engine and an input shaft extending from a transmission, said clutch comprising:
  a clutch disk assembly having a friction coupling member adjacent to the flywheel, said friction coupling member being configured to be non-rotatably coupled with the input shaft of the transmission;
  a clutch cover assembly having a clutch cover configured to be fixedly coupled to the flywheel, a pressure plate disposed adjacent to said friction coupling member, a retainer disposed within said clutch cover, an elastic member positioned between said clutch cover and said retainer to apply a biasing force on said retainer to bias said retainer toward the flywheel, a lever mechanism coupled between said retainer and said pressure plate to magnify said biasing force of said elastic member against said retainer by a predetermined lever ratio, which is transmitted to said pressure plate;
  a tubular member configured to be fixedly coupled to the transmission and extending around the input shaft, said tubular member having a bore that is sized to be radially spaced from the input shaft; and
  a release mechanism operatively coupled to said retainer, said release mechanism having a sleeve coaxially supported on said tubular member for axial movement and a bearing disposed between said sleeve and said retainer, said sleeve having an inner surface with a bushing coupled thereto.

11. A clutch cover assembly comprising:
  a clutch cover configured to be fixedly coupled to a flywheel of an engine;
  a retainer disposed within said clutch cover;
  a pressure plate disposed adjacent to said clutch cover;
  an elastic member positioned between said clutch cover and said retainer to apply a biasing force on said retainer to bias said retainer toward the flywheel;
  a lever mechanism coupled between said retainer and said pressure plate to magnify said biasing force of said elastic member against said retainer by a predetermined lever ratio, which is transmitted to said pressure plate; and
  a release mechanism operatively coupled to said retainer, said release mechanism including a sleeve and bearing means for rotatably coupling said release mechanism to said retainer,
  said sleeve having a first end located within said clutch cover, a second end located outside of said clutch cover and a bore extending between said first and second ends for receiving an input shaft of a transmission therein, said bearing means being disposed on said first end of said sleeve between said sleeve and said retainer such that an outer circumferential surface of said bearing means contacts said retainer and an inner circumferential surface of said bearing means contacts said sleeve.

12. A clutch cover assembly as set forth in claim 11, wherein
said bore of said sleeve has an inner surface with an annular groove which is adapted to receive a lubricant material.

13. A clutch cover assembly as set forth in claim 11, wherein
said bore of said sleeve has an inner surface with a bushing coupled thereto.

14. A clutch cover assembly as set forth in claim 11, wherein
said lever mechanism has a first end in contact with a radial end surface of said retainer, a second end supported by said clutch cover and an intermediate portion extending towards said pressure plate to transmit said biasing force from said elastic member to said pressure plate.

15. A clutch cover assembly as set forth in claim 14, wherein
said lever mechanism includes a plurality of circumferentially spaced lever members.

16. A clutch cover assembly as set forth in claim 15, wherein
said second end of said lever mechanism contacts adjuster ring which is adjustably coupled to said clutch cover for axial adjustment.

17. A clutch cover assembly as set forth in claim 11, wherein
said elastic member is a conical spring with an outer circumferential end engaging said clutch cover and an inner circumferential end engaging said retainer.

18. A clutch cover assembly as set forth in claim 11, wherein
said bore of said sleeve is larger along said second end of said sleeve than said first end of said sleeve.

19. A clutch cover assembly as set forth in claim 18, wherein
said second end of said sleeve has a housing coupled thereto.

20. A clutch cover assembly comprising:
  a clutch cover configured to be fixedly coupled to a flywheel of an engine;
  a retainer disposed within said clutch cover;
  a pressure plate disposed adjacent to said clutch cover;
  an elastic member positioned between said clutch cover and said retainer to apply a biasing force on said retainer to bias said retainer toward the flywheel;

a lever mechanism coupled between said retainer and said pressure plate to magnify said biasing force of said elastic member against said retainer by a predetermined lever ratio, which is transmitted to said pressure plate; and a release mechanism operatively coupled to said retainer, said release mechanism including a sleeve and a bearing, said sleeve having a first end located within said clutch cover, a second end located outside of said clutch cover and a bore extending between said first and second ends for receiving an input shaft of a transmission therein, said bearing being disposed on said first end of said sleeve between said sleeve and said retainer, said bearing having an inner race coupled to said first end of said sleeve, an outer race coupled to said retainer and roller members located between said inner and outer races.

21. A clutch for transmitting torque between a flywheel of an engine and an input shaft extending from a transmission, said clutch comprising:

a clutch disk assembly having a friction coupling member adjacent to the flywheel, said friction coupling member being configured to be non-rotatably coupled with the input shaft of the transmission;

a clutch cover assembly having a clutch cover configured to be fixedly coupled to the flywheel, a pressure plate disposed adjacent to said friction coupling member, a retainer disposed within said clutch cover, an elastic member positioned between said clutch cover and said retainer to apply a biasing force on said retainer to bias said retainer toward the flywheel, a lever mechanism coupled between said retainer and said pressure plate to magnify said biasing force of said elastic member against said retainer by a predetermined lever ratio, which is transmitted to said pressure plate;

a tubular member configured to be fixedly coupled to the transmission and extending around the input shaft, said tubular member having a bore that is sized to be radially spaced from the input shaft; and a release mechanism operatively coupled to said retainer, said release mechanism having a sleeve coaxially supported on said tubular member for axial movement and a bearing disposed between said sleeve and said retainer, said bearing having an inner race coupled to said sleeve, an outer race coupled to said retainer and roller members located between said inner and outer races.

22. A clutch as set forth in claim 21, wherein said sleeve has a flywheel side portion located within said clutch cover and a transmission side portion located outside of said clutch cover, said bearing being disposed on said flywheel side portion.

23. A clutch as set forth in claim 22, wherein said transmission side portion of said sleeve has a housing coupled thereto.

24. A clutch as set forth in claim 21, wherein said sleeve has an inner surface with an annular groove which is adapted to receive a lubricant material.

25. A clutch as set forth in claim 21, wherein said sleeve has an inner surface with a bushing coupled thereto.

26. A clutch as set forth in claim 21, wherein said lever mechanism has a first end in contact with a radial end surface of said retainer, a second end supported by said clutch cover and an intermediate portion extending towards said pressure plate to transmit said biasing force from said elastic member to said pressure plate.

27. A clutch as set forth in claim 26, wherein said second end of said lever mechanism contacts adjuster ring which is adjustably coupled to said clutch cover for axial adjustment.

28. A clutch as set forth in claim 21, wherein said elastic member is a conical spring with an outer circumferential end engaging said clutch cover and an inner circumferential end engaging said retainer.

29. A clutch as set forth in claim 21, wherein said lever mechanism includes a plurality of circumferentially spaced lever members.

\* \* \* \* \*